US011396463B2

(12) United States Patent
Mullen et al.

(10) Patent No.: US 11,396,463 B2
(45) Date of Patent: Jul. 26, 2022

(54) METHOD FOR ELECTROCHEMICAL TREATMENT OF WATER

(71) Applicant: THE UNIVERSITY OF MASSACHUSETTS, Boston, MA (US)

(72) Inventors: Julie Bliss Mullen, North Oxford, MA (US); David A. Reckhow, Northampton, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 429 days.

(21) Appl. No.: 16/349,004

(22) PCT Filed: Nov. 10, 2017

(86) PCT No.: PCT/US2017/061030
§ 371 (c)(1),
(2) Date: May 10, 2019

(87) PCT Pub. No.: WO2018/089751
PCT Pub. Date: May 17, 2018

(65) Prior Publication Data

US 2019/0284066 A1 Sep. 19, 2019

Related U.S. Application Data

(60) Provisional application No. 62/420,109, filed on Nov. 10, 2016.

(51) Int. Cl.
*C02F 1/46* (2006.01)
*C02F 1/467* (2006.01)
(Continued)

(52) U.S. Cl.
CPC ........ *C02F 1/4674* (2013.01); *C02F 1/46109* (2013.01); *C25B 9/00* (2013.01);
(Continued)

(58) Field of Classification Search
CPC ... C02F 1/46; C25B 9/00; C25B 11/03; C25B 11/04
See application file for complete search history.

(56) References Cited

U.S. PATENT DOCUMENTS 4,422,917 A * 12/1983 Hayfield ................ C25B 11/04 204/196.01
5,463,170 A * 10/1995 von Wedel ......... B01D 53/8662 588/320

(Continued)

FOREIGN PATENT DOCUMENTS

WO 2008062170 A1 5/2008
WO 2016133985 A1 8/2016

OTHER PUBLICATIONS

International Search Report dated Jan. 25, 2018; International Application No. PCT/US17/61030; International Filing Date Nov. 10, 2017 (2 pgs.).

(Continued)

*Primary Examiner* — Walter D. Griffin
*Assistant Examiner* — Cameron J Allen
(74) *Attorney, Agent, or Firm* — Cantor Colburn LLP

(57) ABSTRACT

A method for electrochemical treatment of water is provided. The method includes providing a flow-through reactor including a cathode and an anode, wherein the anode includes about 80 weight percent or greater of a sub-stoichiometric titanium oxide. The method further includes applying power to the cathode and the anode, passing a solution including water and a metal chloride through the flow-through reactor, and withdrawing the purified water.

20 Claims, 7 Drawing Sheets

12
11
12
11
INFLUENT SOLUTION

(51) Int. Cl.

| | |
|---|---|
| ***C02F 1/461*** | (2006.01) |
| ***C25B 9/00*** | (2021.01) |
| ***C25B 11/04*** | (2021.01) |
| ***C25B 11/031*** | (2021.01) |

(52) U.S. Cl.

CPC ............ *C25B 11/031* (2021.01); *C25B 11/04* (2013.01); *C02F 2001/46133* (2013.01); *C02F 2001/46157* (2013.01); *C02F 2001/46161* (2013.01); *C02F 2001/46171* (2013.01); *C02F 2209/02* (2013.01); *C02F 2209/04* (2013.01); *C02F 2209/05* (2013.01); *C02F 2209/06* (2013.01); *C02F 2209/29* (2013.01); *C02F 2209/40* (2013.01)

(56) References Cited

U.S. PATENT DOCUMENTS 6,328,875 B1 12/2001 Zappi et al.
6,998,031 B1 2/2006 Hill
2009/0218227 A1* 9/2009 Noh ..................... C02F 1/4691 204/666
2012/0312687 A1 12/2012 Miller
2017/0152163 A1* 6/2017 Chaplin ................. B01D 69/10

OTHER PUBLICATIONS

Written Opinion dated Jan. 25, 2018; International Application No. PCT/US2017/061030; International Filing Date Nov. 10, 2017 (6 pgs).

Guo, L. et al. “Development and Characterization of Ultrafiltration TiO2 Magneli Phase Reactive Electrochemical Membranes”, Environmental Science & Technology, vol. 50, 2016; pp. 1428-1436.

Zaky, A. M. et al., “Porous Substoichiometric TiO2 Anodes as Reactive Electrochemical Membranes for Water Treatment”, Environmental Science & Technology, vol. 47, 2013; pp. 6554-6563.

European Search Report for the corresponding European Application No. 17869026; dated Jun. 17, 2020; 10 pages.

* cited by examiner

METHOD FOR ELECTROCHEMICAL TREATMENT OF WATER

CROSS-REFERENCE TO RELATED APPLICATIONS

This application is a National Stage application of PCT/US2017/061030, filed Nov. 10, 2017, which claims the benefit of U.S. Provisional Application No. 62/420,109, filed Nov. 10, 2016, both of which are incorporated herein in their entireties by reference.

FIELD

The present disclosure generally relates to the field of electrochemical purification of water. Particularly, the present disclosure provides a method for electrochemical treatment of water in a flow-through reactor using an anode including sub-stoichiometric titanium oxide electrode material.

INTRODUCTION

With increasing occurrence of various microorganisms and anthropogenic pollutants in the environment, access to clean drinking water is a growing concern around the world. The quality of water available for potable use varies greatly depending on the source and active pretreatment processes. Varying characteristics of source waters make treatment difficult to control. Each constituent in water may have unique properties which dictate the type of treatment process used for removal (i.e., physical or chemical). The majority of commercialized water treatment systems do not have the physical and chemical capability to treat varying water sources because of their limited treatment capacities. In attempting to address these issues in home treatment systems, recent technologies have emerged involving the combination of membranes with advanced oxidation processes.

However, there still remains a need for an efficient, versatile, and cost-effective method of purifying water contaminated with various pathogens, metals, anthropogenic pollutants, and even some naturally-occurring materials.

SUMMARY

The inventors of the subject matter of the present application have developed a versatile, technologically effective, and cost-effective method of water treatment by using a flow-through reactor that utilizes an anode including sub-stoichiometric titanium oxide electrode material.

In an embodiment, a method for electrochemical treatment of water is provided. The method includes providing a flow-through reactor including a cathode and an anode, wherein the anode includes about 80 weight percent or greater of a sub-stoichiometric titanium oxide. The method further includes applying power to the cathode and the anode, passing a solution including water and a chloride through the flow-through reactor, and withdrawing the purified water from the reactor.

In another embodiment, provided is a flow-through reactor including a cathode and an anode, wherein the anode includes about 80 weight percent or greater of a sub-stoichiometric titanium oxide.

BRIEF DESCRIPTION OF THE DRAWINGS

The above and other aspects, advantages, and features of this disclosure will become more apparent by describing in further detail exemplary embodiments thereof with reference to the accompanying drawings, in which.

DETAILED DESCRIPTION

Figure 1:
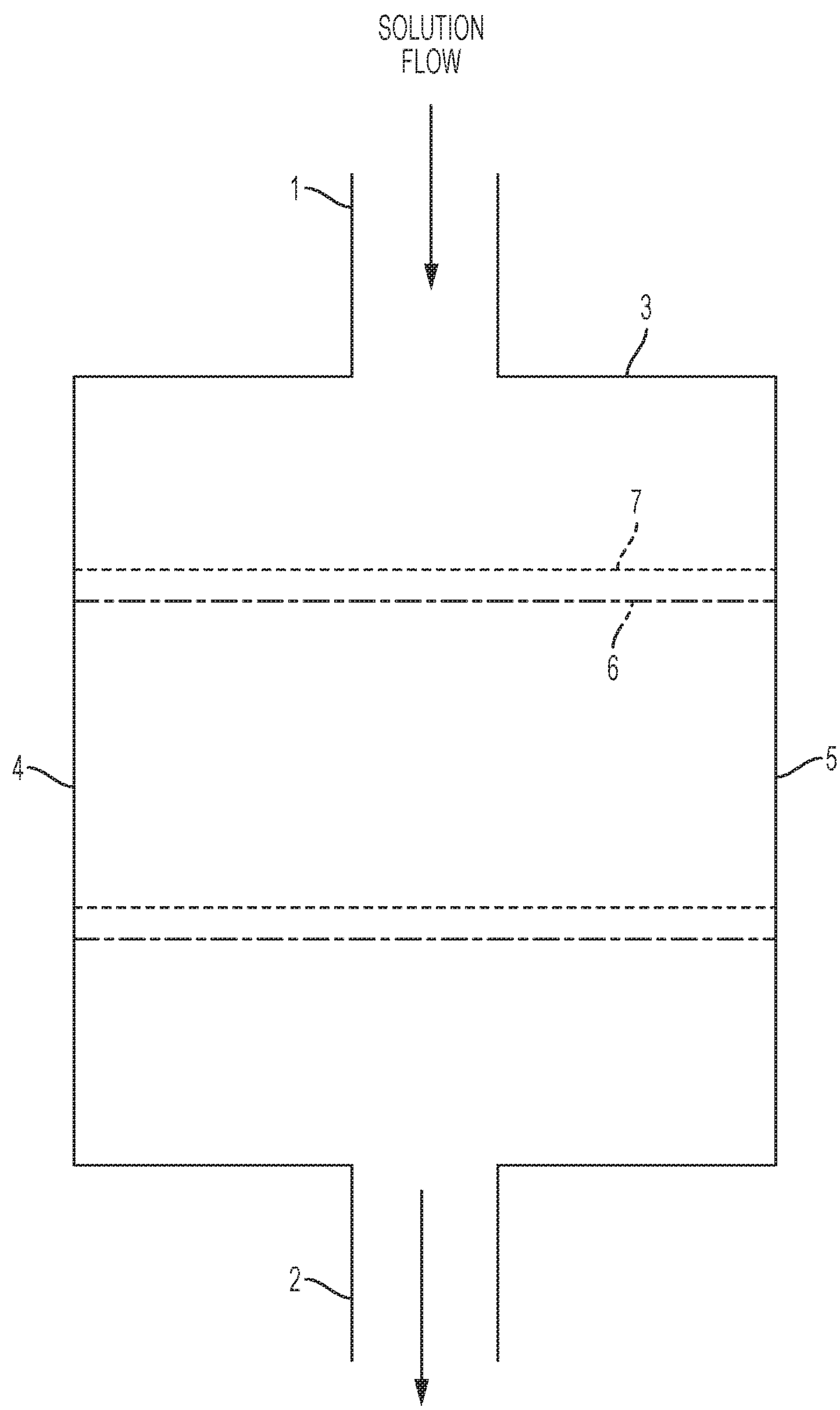
FIG. 1 is a schematic representation of the flow-through reactor, according to an embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly in contact with the other element or intervening elements may be present therebetween. In contrast, when an element is referred to as being "directly on" another element, there are no intervening elements present.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About," "approximately," or "substantially" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about," "approximately," or "substantially" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are directed to a method for electrochemical treatment of water. In an embodiment, the method includes:

providing a flow-through reactor including a cathode and an anode, wherein the anode includes about 80 weight percent or greater of a sub-stoichiometric titanium oxide;

applying power to the cathode and the anode;

passing a solution including water and chloride through the flow-through reactor; and withdrawing the purified water.

In an embodiment, the flow-through reactor may include a reactor shell having an internal wall including two points which are substantially opposite to each other. The anode may be disposed between the two points in a direction substantially perpendicular to a flow of the solution, and the anode may be in contact with the two points of the internal wall.

The flow-through reactor according to this embodiment may be schematically shown in FIG. 1. The reactor may include a supplying means in the form of an inlet (1) for supplying a solution of water and chloride, and a withdrawing means in the form of an outlet (2) for withdrawing purified water. The locations of the inlet (1) and the outlet (2) may vary as desired. A pre-filter may be added in the influent stream or a post-filter may be added in the effluent stream of the solution to catch particles or various inorganic or organic materials. The flow-through reactor may have any practically useful shape that may be utilized for water purification purposes. The reactor shown in FIG. 1 has a cubical shape, but the shape of the reactor is not limited thereto.

The reactor may further include a reactor shell (3), which has a first side (4) and a second side (5) opposite to the first side (4). Located between the two sides is an anode (6) which extends from the first side (4) of the reactor shell to its second side (5) in a direction substantially perpendicular to the flow of the solution. As shown in FIG. 1, the anode (6) may be in contact with the first side (4) and the second side (5) of the reactor.

The cathode (7) may be disposed in a direction substantially parallel to the anode (6), and the cathode (7) may be disposed substantially perpendicular to the flow of the solution. Herein, the two objects are "substantially perpendicular" when the angles between the objects are about 90°±10°. The two objects are "substantially parallel" when the angle between the objects are 0°±10°. The reactor shown in FIG. 1 includes a set of electrodes consisting of the cathode (7) and the anode (6), which are substantially parallel to each other. Within this set, the electrode located closer to the inlet may be a cathode and the electrode located further away may be an anode. Alternatively, the electrode located closer to the inlet may be an anode and the electrode located further away may be a cathode. The distance between the cathode and the anode within the electrode set may be from several nanometers to several micrometers or from several micrometers to several centimeters. Generally, the closer the electrodes, the better the electron transfer is, and the less conductivity the influent water needs to have. However, the electrodes may be further apart and still be effective. The electrodes should not be in direct contact with each other. The anode (6) and the cathode (7) may be separated by a porous dielectric material or a non-conductive material such as a gasket. To ensure more efficient water purification, the flow-through reactor may include two or more sets of electrodes. The reactor shown in FIG. 1 includes two sets of electrodes, each set consisting of a cathode and an anode.

The cathode (7) and the anode (6) shown in FIG. 1 may independently be a reactive electrochemical membrane ("REM"), which may include sub-stoichiometric titanium oxide porous or non-porous electrode material. The amount of the porous electrode material in the membrane may be about 80 weight percent or greater, for example, about 85 weight percent or greater, about 90 weight percent or greater, or about 95 weight percent or greater, based on 100 weight percent of the reactive electrochemical membrane. In some embodiments, the amount of the sub-stoichiometric titanium oxide porous electrode material in the membrane may be about 96 weight percent or greater, for example, about 97 weight percent or greater, about 98 weight percent or greater, or about 99 weight percent or greater, based on 100 weight percent of the reactive electrochemical membrane. In still some embodiments, the amount of the sub-stoichiometric titanium oxide porous electrode material in the membrane may be about 99.5% or greater, about 99.9% or greater, or about 99.99% or greater.

As used herein, the term "sub-stoichiometric titanium oxide" refers a titanium oxide having general formula $Ti_nO_{2n-1}$. The sub-stoichiometric titanium oxide may be $Ti_4O_7$, $Ti_5O_9$, $Ti_6O_{11}$, but is not limited thereto. In an embodiment, the sub-stoichiometric oxide may be $Ti_4O_7$. In other embodiments, the sub-stoichiometric titanium oxide may be a mixture of sub-stoichiometric titanium oxides.

Once an appropriate flow-through reactor is selected, the power is applied to the cathode and the anode, and a solution is passed through the electrodes resulting in electrochemical purification of water. The purified water is subsequently withdrawn from the reactor. The applied power may be reversed periodically to prevent passivation of the electrodes and to ensure more effective water purification. In this embodiment, the cathode may include a sub-stoichiometric titanium oxide or some other galvanized metal. The reactor may be periodically backwashed into wastewater.

In another embodiment, the flow-through reactor may include a reactor shell having an internal wall including two points which are substantially opposite to each other. The anode may be disposed between the two points of the internal wall in a direction substantially perpendicular to the flow of the solution, and the anode may be in contact with only one of the two points.

Figure 2:
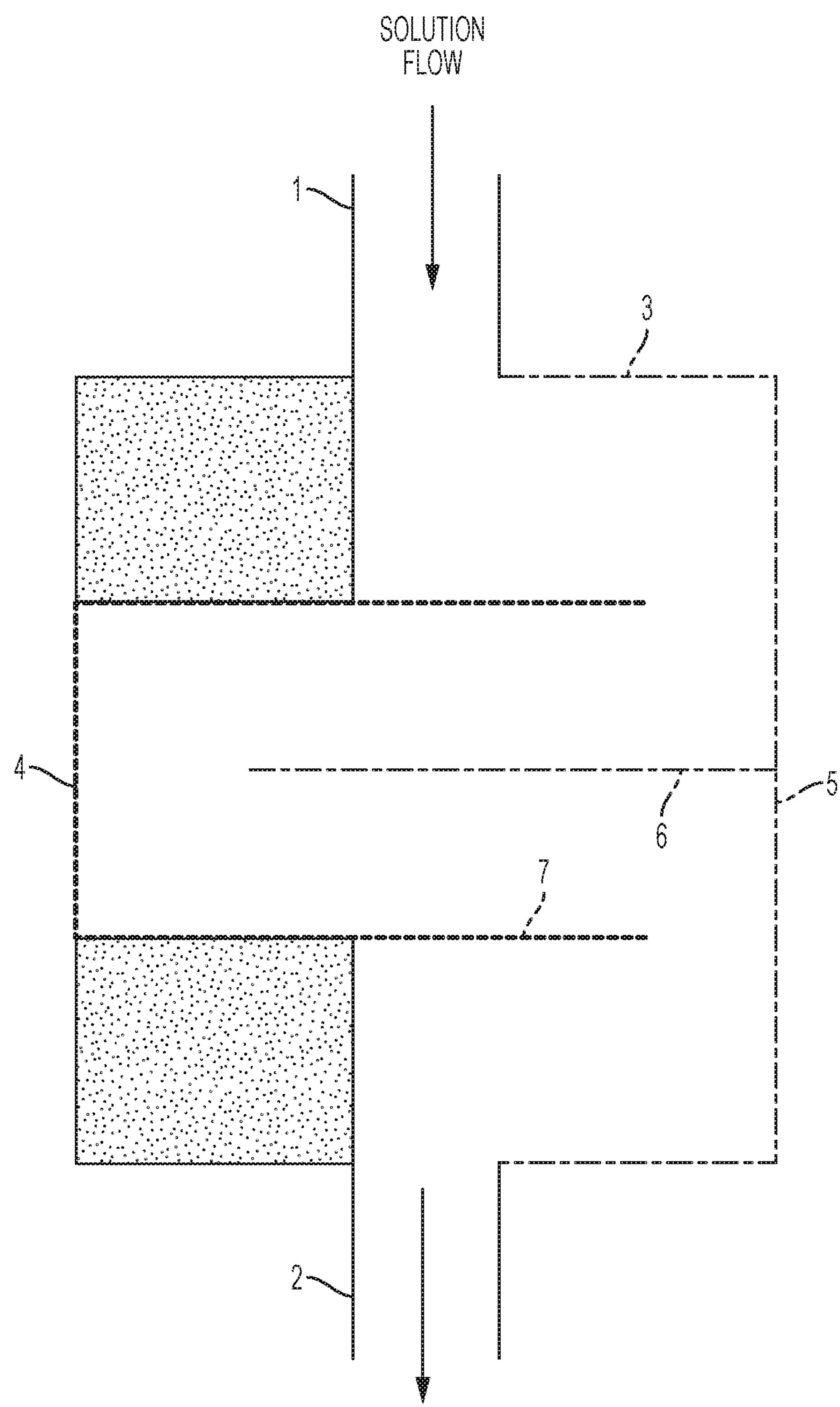
FIG. 2 is a schematic representation of the flow-through reactor according to another embodiment.

The flow-through reactor according to this embodiment may be shown FIG. 2. In this reactor, the cathode (7) includes the first side (4) of the reactor shell (3) having one or more electrodes extending towards the second side (5) thereof without contacting the second side (5). The anode (6) includes the second side (5) of the reactor shell (3) having one or more electrodes extending towards the first side (4)

of the reactor shell (3) without contacting the first side (4). The electrodes may be solid, porous, mesh, or membranes, each of which may include sub-stoichiometric titanium oxide in the amounts described in connection with FIG. 1. According to this embodiment, the solution flows through the reactor in baffles of alternating polarity while undergoing electrochemical purification. Although FIG. 2 shows two cathodes (7) extending from the first side (4) and one anode (6) extending from the second side (5), additional electrodes may be included to increase detention time of the solution in the reactor and surface area contact thereof with the electrodes.

Figure 3:
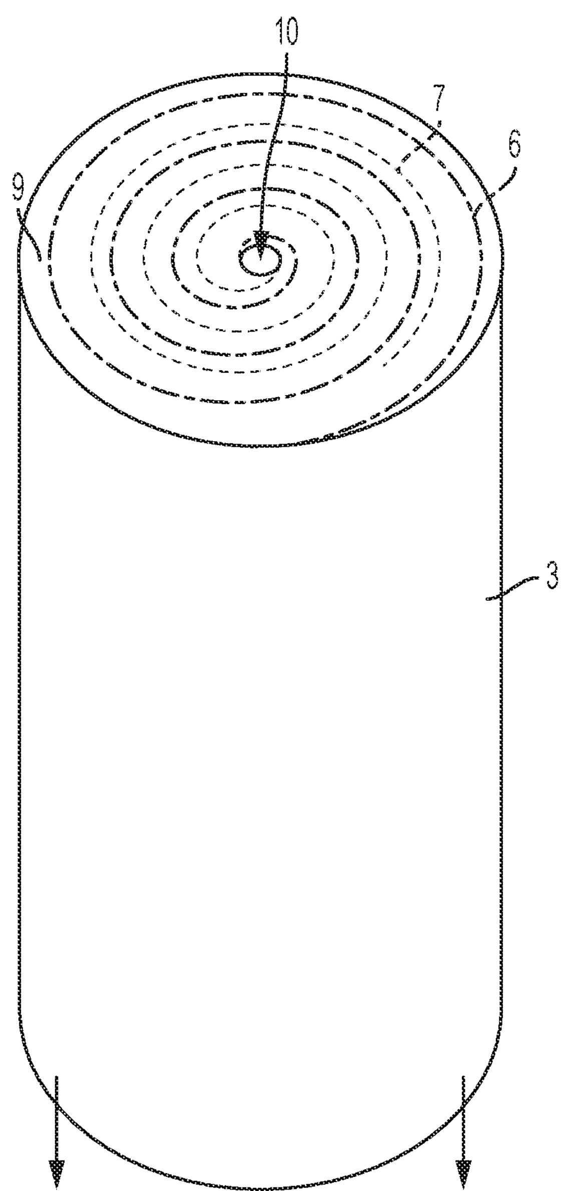
FIG. 3 is a schematic representation of the flow-through reactor according to still another embodiment.

FIG. 3 schematically shows a flow-through reactor, according to still another embodiment. The reactor has a hollow reactor shell (3) having an internal wall (9), and a tubal member (10) disposed inside the hollow reactor shell (3). In this embodiment, the anode (6) may be a reactive electrochemical membrane disposed between the tubal member (10) and the internal wall (9) of the hollow reactor shell (3). The anode (6) may have a form of a roll extending from an external wall (not shown) of the tubal member (10) towards the internal wall (9) of the hollow reactor shell (3). The cathode (7) may also be a reactive electrochemical membrane disposed between the external wall of the tubal member (10) and the internal wall (9) of the hollow reactor shell (3), and may be in the form of a roll extending in a direction substantially parallel to the anode (6). The solution is passed through the tubal member (10) of the cathode into a hollow space between the outside wall (not shown) of the tubal member (10) and the inside wall (9) of the reactor shell (3). The solution then permeates through the pores of the reactive electrochemical membrane included in the cathode (7) and the anode (6) to generate free electrons, secondary oxidants (e.g., ozone), advanced oxidants (e.g., radical), or a combination thereof to produce purified water, prior to its withdrawal. Thus, in this embodiment, the cathode and the anode may be flexible, porous sheets of alternating positive and negative materials separated by a neutral gasket.

In yet another embodiment, the flow-through reactor may include a reactor base as an anode and a reactor shell as a cathode. The reactor shell may be a cylindrical reactor shell. The reactor base may have a circular shape. When the reactor base has a circular shape, and when the reactor shell is cylindrical, the diameter of the reactor base may be greater than, equal to, or less than the diameter of the cross-section of the cylindrical reactor shell. The reactor base and the reactor shell may be arranged in such a way that the reactor shell is substantially perpendicular to the reactor base. The flow-through reactor may be encapsulated inside a container including a non-conductive material.

Figure 4:
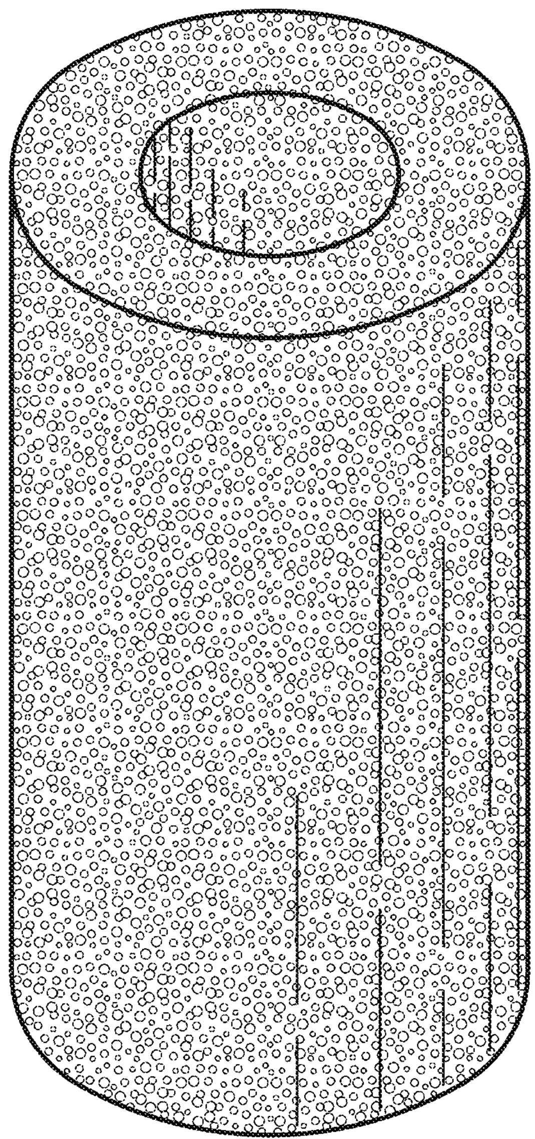
FIG. 4 is a drawing of a reactive electrochemical membrane (REM) including $Ti_4O_7$ porous electrode material.

The anode of the flow-through reactor may also include reactive electrochemical membrane ("REM"), which may be a hollow reactive electrochemical membrane. The membrane may have any shape, for example, a circular shape, an oval shape, a square shape, a rectangular shape, but is not limited thereto. In an embodiment, the membrane may be a hollow cylindrical REM. An example of such a membrane is shown in FIG. 4. The REM may be disposed on the reactor base in the direction substantially perpendicular to the reactor base. In an embodiment, the axis of the reactor shell may pass through the center of the reactor base.

Figure 5:
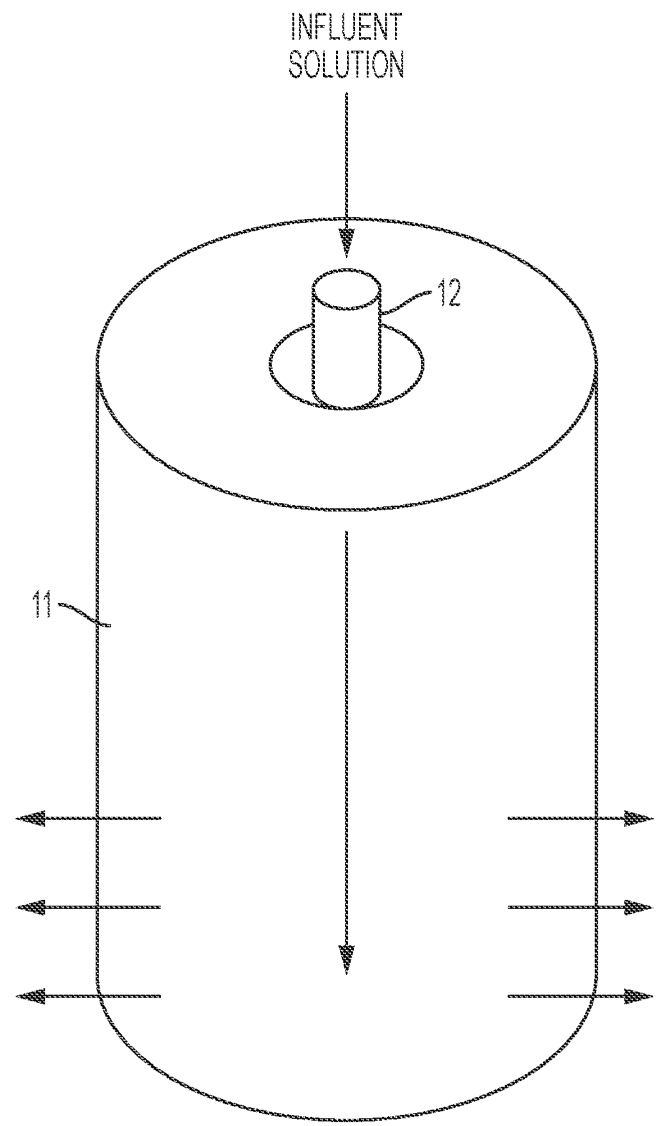
FIG. 5 is a schematic representation of the flow-through reactor according to yet another embodiment.

FIG. 5 schematically shows the flow-through reactor, according to an embodiment, which includes a hollow cylindrical REM (11) including sub-stoichiometric titanium oxide material, a reactor base as the anode, and a tube and reactor wall as the cathode. The cathode of the flow-through reactor may include a reactor shell disposed outside (for example, concentrically outside) the hollow electrochemical membrane (not shown), and may further include a tubal member (12) disposed inside (for example, concentrically inside) the hollow REM. The reactor may include a means for introducing the solution into the tubal member of the cathode, such as a fluid inlet, and may further include a means for withdrawing the purified water, such as a fluid outlet.

Power is applied to the cathode and the anode, and the influent solution is transferred to the top of the reactor and into the tube located vertically in the center of the reactor. The solution exits from the bottom of the tube and permeates the REM through its pores. The treated (purified) water then flows upwards and out to the effluent.

The reactor base and the tubal member of the cathode may include a metal or a metal alloy. Examples of metal may include titanium and stainless steel, but are not limited thereto. Examples of metal alloy may include aluminum and nickel copper, but are not limited thereto. In an embodiment, the reactor base and the tubal member of the cathode may include stainless steel, substoichiometric titanium oxide, or a combination thereof.

A tubal member of the cathode may be substantially perpendicular to the reactor base. In an embodiment, the tubal member may be disposed horizontally and the tubal member of the reactor may be disposed vertically above the center of the reactor base.

The flow-through reactor, according to any embodiment, may further include an oxidation-reduction potential sensor, a pH sensor, a chlorine sensor, a conductivity sensor, a flow rate sensor, a temperature sensor, or a combination thereof.

Figure 6:
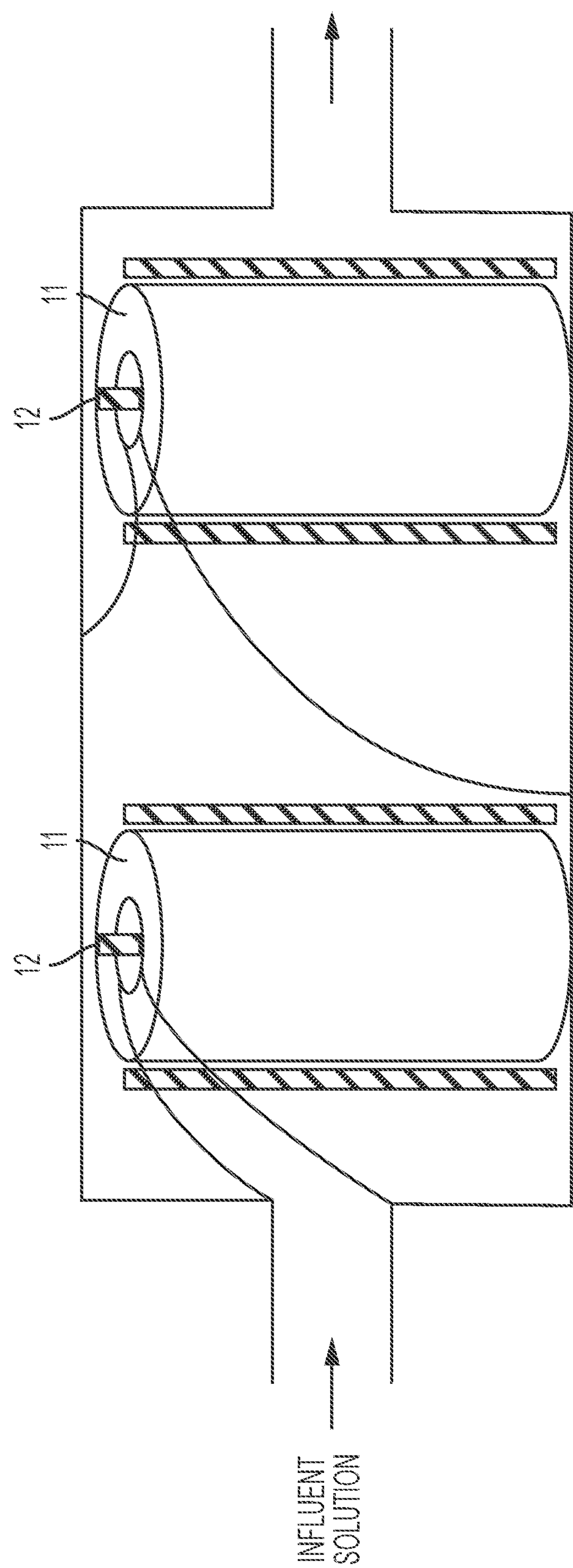
FIG. 6 is a schematic representation of sequentially connected internal flow-through reactors, according to another embodiment.

In another embodiment, a flow-through reactor may include two or more sequentially connected individual flow-through reactors described in FIG. 6. Each individual reactor includes a reactive electrochemical membrane (11) disposed inside a cylindrical cathode (12). The reactive electrochemical membrane (11) may be made of a porous or fine material, and the cylindrical cathode (12) may be made of a porous or solid material. Although FIG. 6 shows two sequentially connected reactive electrochemical membranes, the reactor may include three, four, or greater number of membranes to achieve a desired degree of water purification. As explained above with reference to FIG. 5, the influent solution is pumped into the tubal member located vertically in the center of the reactor. The solution exits from the bottom of the tubal member into the space between the reactive electrochemical membrane and the cylindrical cathode permeating throughout the membrane. The treated water is then delivered to the next flow-through reactor, where the purification process is repeated.

The advantages for using the present REM included in the anode for electrochemical water treatment, are that it has high corrosion resistance to acidic and basic solutions, is highly electrically conductive, very hydrophilic, and electrochemically stable. In addition to the favorable physical and chemical properties, the anode including the REM is amongst the most affordable in electrochemical treatment (an order of magnitude less expensive per cubic meter compared to similar boron-doped diamond membranes known in the art).

As stated in the background section of the present application, one of the major problems with water treatment systems is the inability to treat a wide range of contaminants due to the limited removal process. The presently developed water treatment device tackles this problem with the production of direct oxidants such as free electrons (electron transfer), advanced oxidants (e.g., hydroxyl radicals), and disinfectants/oxidants (e.g., free chlorine), which are formed at the anode surface. The produced free electrons, chlorine, ozone, and hydroxyl radicals are capable of treating a wide variety of different contaminants. When the solution is treated electrochemically within the flow-through reactor, some water is oxidized to form hydroxyl radicals and ozone on the anode surface. The formed radicals react quickly with most organic material present in water forming carbon dioxide and less harmful byproducts. In addition, direct destruction of constituents occurs where electrons are transferred from the contaminant to the anode. Direct oxidation treats other constituents in water that hydroxyl radicals do not (e.g., fluorinated compounds). One of the major advantages of the present method is that free chlorine is also formed during the process in concentrations sufficient for disinfection of many waterborne pathogens from ambient chloride in the water or added sodium chloride (NaCl). The combination of hydroxyl radical formation, direct oxidation, and chlorine formation enables transformative oxidation of pathogens and chemical contaminants present in water. The pathogens may include *E-coli*, giardia, *cryptosporidium*, enteric viruses, but are not limited thereto.

The influent solution may be a solution of a metal chloride, such as sodium chloride, in deionized water, tap water, or source water. The metal chloride may be an alkali metal chloride, an alkaline earth metal chloride, a combination thereof, but is not limited thereto. The solution may include a variety of living microorganisms, anthropogenic compounds, natural compounds, or any combination thereof. The microorganism may be a bacterium, a virus, a protozoa, or a parasite. Different kinds of microorganisms may be simultaneously present.

To provide water, which is free of the microorganisms that may adversely affect human and animal health, the present method for electrochemical treatment of water further may further include contacting the live microorganism with the generated chlorine, ozone, a plurality of advanced oxidants, or a combination thereof; and terminating the live microorganism in the solution to produce purified water.

Another advantage of the present method is that substantial amounts of chlorine are produced with very low applied voltages and chloride concentrations. CT values calculated from the laboratory data show the significance of this feature specifically for the disinfection of bacteria and viruses. The CT value is a value given for individual or groups of microorganisms by the US Environmental Protection Agency (EPA), wherein "C" is the concentration of the disinfectant and "T" is the contact time. The generally established CT value for viruses and the Giardia parasite with a chlorine concentration of 2.4 milligrams per liter (mg/L) at 5° C., pH 7 with 99.99% removal is 8 and 172 milligram-minutes per liter (mg-min/L), respectively. With the current prototype contact time of just over one minute, the CT value is greater than 220 mg-min/L with 100 mg/L NaCl and an applied power of less than 10 watts (W). For hard-to kill pathogens, such as *cryptosporidium*, other oxidants like ozone or electrochemically generated hydroxyl radicals will assist the chlorine to disinfect the solution.

In an embodiment, wherein a CT value for a 99.99% virus removal or a 99.99% Giardia parasite removal with a metal chloride concentration of 100 milligrams per liter and applied power of 10 watts may be greater than about 220 milligram-minutes per liter.

It is noted that chlorine and other oxidants (ozone and hydroxyl radicals) are generated by the present method through one mechanism which reduces the need to purchase commercial disinfectants to supplement one oxidant with another. Prior art suggests that it takes 3.5 kilowatt-hours (kWh) to produce one kilogram of chlorine at a bleaching plant (*Environmental Fate and Effects of Pulp and Paper Mill Effluents,* 1996, 681-691). Considering only disinfection, 25.54 milligrams per liter (mg/L) of chlorine was measured at the effluent in a test run with 10 milligrams per liter (mg/L) of NaCl in the influent and an applied voltage of 5 volts (V) and current of 0.04 amperes (A). The power equation for a DC power supply is:

$$PP=VV*II/1000$$

where PP is the power in kilowatts,

VV is volts, and

II is current in amperes.

Using the above example, the power was calculated as 0.0002 kilowatts (kW). The theoretical water contact time was one minute (175 mL/175 mL/min), therefore it took 3.34E-06 kWh to produce 25.54 milligrams per liter (mg/L) of chlorine. The total mass of chlorine was calculated as 4.47E-06 kilograms (kg). As a result, with the presently disclosed reactor, it takes about 0.75 kWh to produce one kilogram of chlorine, about 4.7 times less electricity than generating chlorine at a plant to add for disinfection. This lower value also equates to less $CO_2$ emitted per kilogram of chlorine produced. Other life-cycle parameters comparing the electrochemical device with other new water treatment technologies will be assessed once concentration data are obtained for the production of ozone and hydroxyl radicals.

In another embodiment, the flow-through reactor may require about 0.75 kWh of electric energy to generate 1 kg of chlorine with 10 mg/L of chloride.

Figure 7:
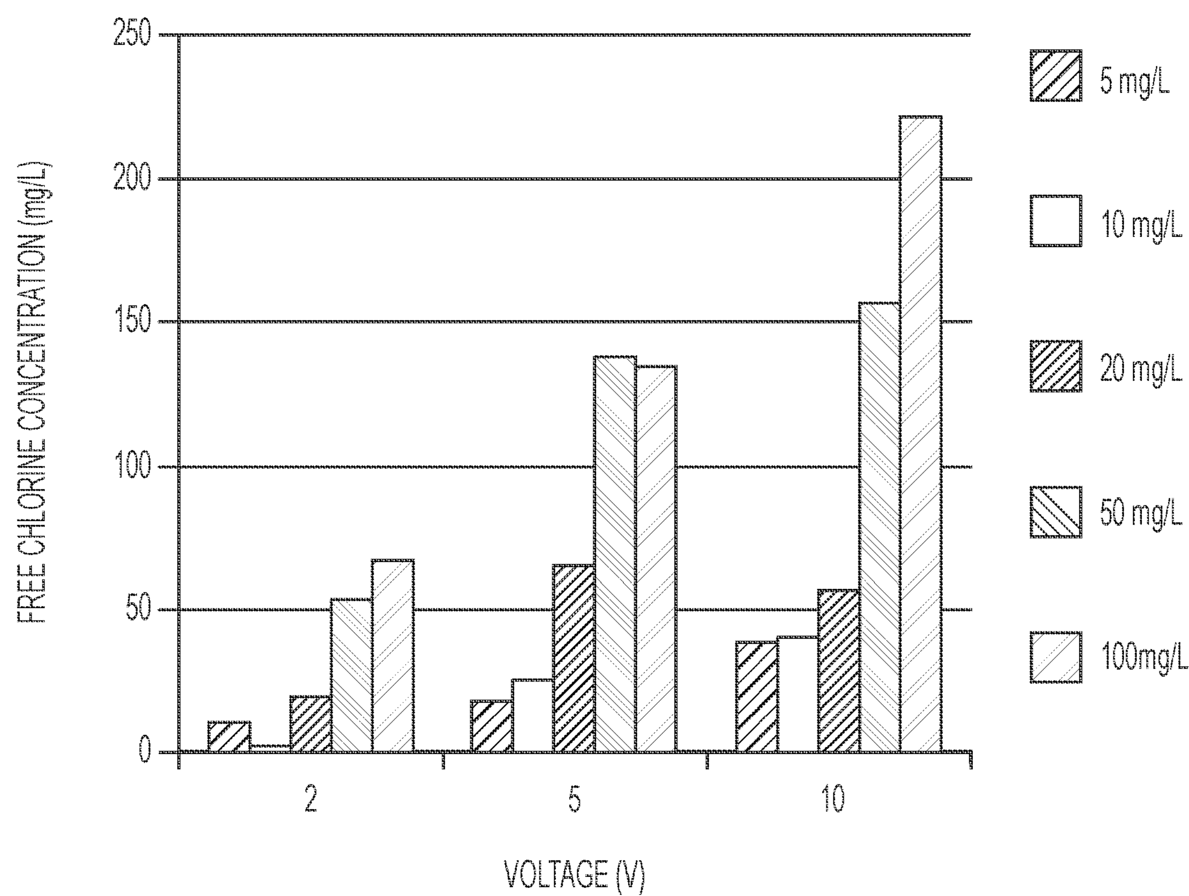
FIG. 7 is a diagram illustrating free chlorine production from hydrolysis of deionized water varying voltages and sodium chloride (NaCl) concentrations with a theoretical mean hydraulic retention time of one minute.

The experimental results from deionized water show increased free chlorine concentrations in the effluent as chloride concentrations and voltages increase (FIG. 7). At low voltages (2-5 volts) and low NaCl concentrations (5 mg/L), measured free chlorine concentrations were between 11 and 39 mg/L. The chlorine concentrations were measured via UV-Vis spectrophotometry. These high chlorine outputs show ample ability of the presently disclosed method to improve water quality.

The influent solution may also include various anthropogenic compounds. Many of these compounds are carcinogens and are highly dangerous for human and animal health. The present method provides an efficient way of oxidizing many anthropogenic compounds to less harmful and oxidation products. The anthropogenic compound may be a pharmaceutical (e.g., ciprofloxacin), a personal care product (e.g., 1,4-dioxane), an inorganic compound (e.g., hydrogen sulfide), metal (e.g., lead), a volatile organic compound (e.g., PCE, TCE), a fluorinated surfactant (e.g., PFOA, PFOS), an endocrine disrupting compound (e.g., estrogen), an organic industrial solvent (e.g., MTBE), but are not limited thereto. The anthropogenic compounds may include inorganic salts present in water and contributing to water hardness, iron, manganese, and lead. The anthropogenic compounds may include a fluorinated or non-fluorinated C6-C30 aromatic organic compound, which may include one or more aromatic rings. Examples of the fluorinated or non-fluorinated C6-C30 aromatic organic compounds may include perfluorooctanoic acid, benzene, naphthalene, anthracene, phenanthrene, tetracene, chrysene, triphenylene, pyrene, pentacene, benzo[a]pyrene, corannulene, benzo[ghi]perylene, coronene, ovalene, but are not limited thereto. The C6-C30 aromatic organic compounds may include a heteroatom, such as nitrogen (N), oxygen (O), sulfur (S), selenium (Se), phosphorus (P), antimony (Sb), arsenic (As), or a combination thereof. Thus, examples of the C6-C30 aromatic organic compounds may also include fused aromatic 1,4-dioxane derivatives, such as 2,3,7,8-tetrachlorodibenzodioxin. Many of these anthropogenic compounds can be readily oxidized by the ozone or any hydroxyl radicals generated by the present method into less harmful, more soluble oxidation products. In an embodiment, the method for electrochemical treatment of water further includes oxidizing the fluorinated or non-fluorinated C6-C30 aromatic organic compound with the generated ozone, free electrons, or advanced oxidants (such as hydroxyl radicals) in the solution to produce purified water.

In an embodiment, a flow-through reactor is provided. The reactor may include:

an anode, and a cathode, wherein the anode includes about 80 weight percent or greater of a sub-stoichiometric titanium oxide.

In another embodiment, the flow-through reactor may include:

a reactor shell having an internal wall including two points which are substantially opposite to each other, an anode disposed between the two points of the internal wall in a direction substantially perpendicular to a flow of the solution, wherein the anode is in contact with the two points of the internal wall, and a cathode disposed between the two points of the internal wall in a direction substantially parallel to the anode and in a direction substantially perpendicular to the flow of the solution, wherein the cathode is in contact with the two points of the internal wall, wherein the anode comprises about 80 weight percent or greater of a sub-stoichiometric titanium oxide.

In still another embodiment, a flow-through reactor may include:

a reactor shell having an internal wall including two points which are substantially opposite to each other, an anode disposed between the two points of the internal wall in a direction substantially perpendicular to the flow of the solution, wherein the anode is in contact with only one of the two points, and a cathode disposed between the two points of the internal wall in a direction substantially parallel to the anode and in a direction substantially perpendicular to the flow of the solution, wherein the cathode is in contact with only one of the two points, wherein the anode comprises about 80 weight percent or greater of a sub-stoichiometric titanium oxide.

In another embodiment, a flow-through reactor may include:

a hollow reactor shell having an internal wall, a tubal member disposed inside the hollow reactor shell, an anode, that is a reactive electrochemical membrane disposed between the tubal member and the internal wall of the hollow reactor shell, and wherein the anode has a form of a roll extending from an external wall of the tubal member towards the internal wall of the hollow reactor shell; and the cathode, that is a reactive electrochemical membrane disposed between the tubal member and the internal wall of the hollow reactor shell in a direction substantially parallel to the anode, wherein the anode comprises about 80 weight percent or greater of a sub-stoichiometric titanium oxide.

In yet another embodiment, a flow-through reactor may include:

an anode including a reactor base and a hollow reactive electrochemical membrane disposed on the reactor base, wherein the membrane includes about 80 weight percent or greater of a sub-stoichiometric titanium oxide porous electrode material, a cathode including a reactor shell disposed outside the hollow electrochemical membrane, and a tubal member disposed inside the hollow reactive electrochemical membrane.

While this disclosure has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

The invention claimed is:

1. A method for electrochemical treatment of water, comprising:

providing a flow-through reactor comprising a cathode and an anode, wherein the anode comprises about 80 weight percent or greater of a sub-stoichiometric titanium oxide;

applying power to the cathode and the anode;

passing a solution comprising water and chloride through the flow-through reactor; and withdrawing purified water, wherein the flow through-reactor comprises a hollow reactor shell;

wherein the anode comprises a reactive electrochemical membrane disposed inside the hollow reactor shell;

and wherein passing the solution comprising water and chloride through the flow-through reactor comprises permeating the solution through pores in the reactive electrochemical membrane, wherein the flow-through reactor further comprises a tubal member disposed inside the hollow reactor shell, wherein the anode is disposed between the tubal member and the internal wall of the hollow reactor shell, wherein the anode has a form of a roll extending from an external wall of the tubal member towards the internal wall of the hollow reactor shell;

wherein the solution is passed through the tubal member into a hollow space between the outside wall of the tubal member and the inside wall of the reactor shell, wherein the permeating the solution through the pores of the reactive electrochemical membrane generates chlorine, ozone, free electrons, hydroxyl radicals or a combination thereof to produce purified water, prior to withdrawing the purified water.

2. The method of claim 1, wherein the cathode is a reactive electrochemical membrane disposed between the tubal member and the internal wall of the hollow reactor shell in a direction substantially parallel to the anode.

3. The method of claim 1, wherein the cathode is characterized by one or more of the following:

comprising a sub-stoichiometric titanium oxide;

is solid, porous, mesh, or membrane.

4. The method of claim 1, wherein the sub-stoichiometric titanium oxide is $Ti_4O_7$.

5. The method of claim 1, wherein the chloride is an alkali metal chloride, an alkaline earth metal chloride, or a combination thereof.

6. The method of claim 1, wherein the solution further comprises a live microorganism, an anthropogenic compound, a natural compound, or a combination thereof and wherein the method optionally comprises one or more of the following:

contacting the live microorganism with generated oxidants selected from chlorine, ozone, free electrons, hydroxyl radicals, and a combination thereof;

oxidizing the anthropogenic compound which is a fluorinated or non-fluorinated C6-C30 aromatic organic compound with the generated oxidants in the solution.

7. The method of claim 1, wherein the flow-through reactor further comprises an oxidation-reduction potential sensor, a pH sensor, a chlorine sensor, a conductivity sensor, a flow rate sensor, a temperature sensor, or a combination thereof.

8. The method of claim 1, wherein the flow-through reactor requires about 0.75 kilowatt-hours of electric energy to generate 1 kilogram of chlorine from a solution having a metal chloride concentration of about 10 milligrams per liter, and/or a CT value for a 99.99% virus removal or a 99.99% Giardia parasite removal with a metal chloride concentration of 100 milligrams per liter and applied power of 10 watts is greater than about 220 milligram-minutes per liter.

9. A method for electrochemical treatment of water, comprising:

providing a flow-through reactor comprising a cathode and an anode, wherein the anode comprises about 80 weight percent or greater of a sub-stoichiometric titanium oxide;

applying power to the cathode and the anode;

passing a solution comprising water and chloride through the flow-through reactor; and withdrawing purified water, wherein the flow through-reactor comprises a hollow reactor shell;

wherein the anode comprises a reactive electrochemical membrane disposed inside the hollow reactor shell;

and wherein passing the solution comprising water and chloride through the flow-through reactor comprises permeating the solution through pores in the reactive electrochemical membrane, wherein the anode further comprises a reactor base and the reactive electrochemical membrane is hollow and is disposed on the reactor base, wherein the cathode comprises the reactor shell disposed outside the hollow electrochemical membrane, and a tubal member disposed inside the hollow reactive electrochemical membrane, wherein the solution is passed through the tubal member of the cathode into a hollow space between an outside wall of the tubal member of the cathode and an inside wall of the reactive electrochemical membrane; and wherein the passing a flow of a solution comprising water and chloride through the flow-through reactor comprises permeating the solution through the pores of the reactive electrochemical membrane into a hollow space between an outside wall of the reactive electrochemical membrane and an inside wall of the reactor shell to generate chlorine, ozone, free electrons, hydroxyl radicals or a combination thereof to produce purified water, prior to withdrawing the purified water.

10. The method of claim 9, wherein the cathode comprises a sub-stoichiometric titanium oxide.

11. The method of claim 9, wherein the cathode is solid, porous, mesh, or membrane.

12. The method of claim 9, wherein the sub-stoichiometric titanium oxide is $Ti_4O_7$.

13. The method of claim 9, wherein the chloride is an alkali metal chloride, an alkaline earth metal chloride, or a combination thereof.

14. The method of claim 9, wherein the solution further comprises a live microorganism, an anthropogenic compound, a natural compound, or a combination thereof.

15. The method of claim 14, wherein the solution further comprises the live microorganism; and wherein the method further comprises contacting the live microorganism with generated oxidants selected from chlorine, ozone, free electrons, hydroxyl radicals, and a combination thereof.

16. The method of claim 14, wherein the anthropogenic compound is a fluorinated or non-fluorinated C6-C30 aromatic organic compound; and wherein the method further comprises oxidizing the fluorinated or non-fluorinated C6-C30 aromatic organic compound with the generated oxidants in the solution to produce purified water.

17. The method of claim 16, wherein the C6-C30 aromatic organic compound comprises a C6-C30 fused aromatic 1,4-dioxane compound.

18. The method of claim 17, wherein the C6-C30 fused aromatic 1,4-dioxane compound is 2,3,7,8-tetrachlorodibenzodioxin.

19. The method of claim 9, wherein the flow-through reactor further comprises an oxidation-reduction potential sensor, a pH sensor, a chlorine sensor, a conductivity sensor, a flow rate sensor, a temperature sensor, or a combination thereof.

20. The method of claim 9, wherein the flow-through reactor requires about 0.75 kilowatt-hours of electric energy to generate 1 kilogram of chlorine from a solution having a metal chloride concentration of about 10 milligrams per liter, and a CT value for a 99.99% virus removal or a 99.99% Giardia parasite removal with a metal chloride concentration of 100 milligrams per liter and applied power of 10 watts is greater than about 220 milligram-minutes per liter.

* * * * *